United States Patent
Rathjen et al.

(10) Patent No.: US 12,491,113 B2
(45) Date of Patent: Dec. 9, 2025

(54) OPHTHALMOLOGICAL DEVICE FOR PROCESSING A CURVED TREATMENT FACE

(71) Applicant: Ziemer Ophthalmic Systems AG, Port (CH)

(72) Inventors: Christian Rathjen, Bremen (DE); Michael Steinlechner, Zurich (CH)

(73) Assignee: Ziemer Ophthalmic Systems AG, Port (CH)

( * ) Notice: Subject to any disclaimer, the term of this patent is extended or adjusted under 35 U.S.C. 154(b) by 555 days.

(21) Appl. No.: 17/864,522

(22) Filed: Jul. 14, 2022

(65) Prior Publication Data

US 2023/0015597 A1    Jan. 19, 2023

(30) Foreign Application Priority Data

Jul. 15, 2021  (CH) ................... 70061/2021

(51) Int. Cl.
*A61F 9/008* (2006.01)
*A61B 18/00* (2006.01)
*A61B 18/20* (2006.01)

(52) U.S. Cl.
CPC .... *A61F 9/008* (2013.01); *A61B 2018/00898* (2013.01); *A61B 2018/20355* (2017.05); *A61B 2018/20361* (2017.05); *A61B 2018/205547* (2017.05); *A61F 2009/00897* (2013.01)

(58) Field of Classification Search
None
See application file for complete search history.

(56) References Cited

U.S. PATENT DOCUMENTS

| | | | |
|---|---|---|---|
| 7,621,637 B2 | 11/2009 | Rathjen et al. | |
| 2009/0069794 A1 | 3/2009 | Kurtz | |
| 2012/0029492 A1 | 2/2012 | Rathjen | |
| 2012/0150156 A1 | 6/2012 | Wolfel et al. | |
| 2018/0028355 A1* | 2/2018 | Raksi | ........... A61B 3/13 |
| 2019/0015250 A1 | 1/2019 | Rathjen | |
| 2019/0015251 A1 | 1/2019 | Rathjen | |
| 2019/0015253 A1 | 1/2019 | Rathjen | |

FOREIGN PATENT DOCUMENTS

WO    2012076032 A1    6/2012

OTHER PUBLICATIONS

Nov. 1, 20216—(CH) Search Report—App 070061/2021.

* cited by examiner

*Primary Examiner* — Lynsey C Eiseman
(74) *Attorney, Agent, or Firm* — Banner & Witcoff, Ltd.

(57) ABSTRACT

An ophthalmological device for processing a curved treatment face in eye tissue comprises a scanner system with a plurality of scan axes configured to move the focal spot to target locations in the eye tissue. A circuit is configured control the scanner system to move the focal spot to target locations along a processing path, defined by treatment control data, to process the curved treatment face in the eye tissue. The circuit is further configured to perform a feasibility check, using the treatment control data and scan capabilities of the scanner system, defined by scan performance characteristics of each particular scan axis. In case the feasibility check indicates that moving the focal spot along the processing path exceeds the scan capabilities of the scanner system, the circuit adjusts the treatment control data.

20 Claims, 10 Drawing Sheets

OPHTHALMOLOGICAL DEVICE FOR PROCESSING A CURVED TREATMENT FACE

CROSS-REFERENCE TO RELATED APPLICATION

The present application claims priority to and the benefit of Switzerland Patent Application 070061/2021 filed Jul. 15, 2021, which is incorporated by reference in its entirety herein.

FIELD OF DISCLOSURE

The present disclosure relates to an ophthalmological device for processing a curved treatment face in eye tissue. In particular, the present disclosure relates to an ophthalmological device comprising a laser source configured to generate a pulsed laser beam, a focussing optical module configured to make the pulsed laser beam converge onto a focal spot in or on the eye tissue, and a scanner system configured to move the focal spot to target locations in or on the eye tissue.

BACKGROUND OF THE DISCLOSURE

For the purposes of working on eye tissue by means of a laser beam, a work region is scanned by laser pulses by virtue of the pulsed laser beam being deflected in one or more scan directions by means of suitable scanner systems and converged onto a focal spot by a focussing optical module. In general, movable mirrors are used to deflect the light beams and/or the laser pulses, for example femtosecond laser pulses, said movable mirrors being pivotable about one or two scan axes, for example by way of galvano scanners, piezo scanners, polygon scanners, or resonance scanners. Further scan components, such as divergence modulators or z-modulators, are known for positioning and moving the focal spot in the eye tissue with respect to further scan axes.

U.S. Pat. No. 7,621,637 describes an apparatus for working on eye tissue, said apparatus having a base station with a laser source for producing laser pulses and a scanner, arranged in the base station, with movable deflection mirrors for deflecting the laser pulses in a scan direction. The deflected laser pulses are transferred via an optical relay system from the base station to an application head, the latter passing over a work region according to a scan pattern by means of a mechanically moved projection optical unit. According to U.S. Pat. No. 7,621,637, in the application head, the deflection in the scan direction, which is much faster in comparison with the mechanical movement, is overlaid onto the mechanical movement of the projection optical unit and consequently onto the scan pattern thereof. A fast scanner system in the base station facilitates a fine movement of the laser pulses (micro-scan), which is overlaid on the scan pattern of the (mechanically) movable projection optical unit that covers a large work region, for example the entire eye.

For processing curved treatment faces in the eye tissue, e.g. for generating curved incision faces in the eye tissue, ophthalmological devices use scanner systems with multiple scan axes and various actuators for producing rotational and translational actuation associated respectively with the scan axes. With the increase of flexibility and performance, these scanner systems made it possible to define and produce three-dimensionally curved treatment faces and volumes of almost any possible shape in the eye tissue. Nevertheless, as the scanner systems and their actuators do have performance limits, there remains a risk that the processing of curved treatment faces in the eye tissue exceeds the performance limits of individual components of the scanner systems, thereby overcharging the scanner system, which leads to undesired alteration of the intended treatment and possibly dangerous and harmful consequences to a patient's eye.

WO 2012/076032 A1 and US 2012/150156 A1 disclose a laser arrangement respectively a laser device, in particular for ophthalmological laser surgery. The laser device of US 2012/150156 A1 comprises a laser source for providing laser radiation, controllable scan components for setting a focus position of the laser radiation, measuring components for registering information that is representative of an actual position of the radiation focus, and also a control arrangement controlling the laser source and the scan components. The control arrangement was set up to bring about the implementation of a test-mode operation of at least some of the scan components with the laser source turned off, in accordance with a predetermined test scan pattern, the test scan pattern defining at least one scan path for the radiation focus, and the control arrangement having been set up to bring about, during a scan movement along the scan path, repeatedly in succession a registration of the actual focus position without stopping the scan movement, and to ascertain a desired focus position, assigned to each registered actual focus position.

US 2009/069794 A1 discloses an apparatus, techniques and systems for interfacing with an eye in laser surgery, in particular a method for inserting a fixation ring between an eye and an optics module and an applanation lens to center and align a surgical laser beam. This document further discloses a patient interface holding the target tissue in position and an optics module configured to direct the surgical laser beam to the target tissue through the patient interface, whereby the laser beam delivery module is operable to scan the surgical laser beam in the target tissue along a predetermined surgical pattern.

SUMMARY OF THE DISCLOSURE

The present disclosure proposes an ophthalmological device for processing a curved treatment face in eye tissue using a scanner system to move a focal spot of a pulsed laser beam, which device does not have at least some of the disadvantages of the prior art. Particularly, the present disclosure proposes an ophthalmological device for processing a curved treatment face in eye tissue, which device avoids overcharging the scanner system.

According to the present disclosure, these advantages are achieved by the features of the independent claims. Moreover, further advantageous embodiments emerge from the dependent claims and the description.

An ophthalmological device for processing a curved treatment face in eye tissue comprises a laser source configured to generate a pulsed laser beam; a focussing optical module configured to make the pulsed laser beam converge onto a focal spot in or on the eye tissue; a scanner system with a plurality of scan axes configured to move the focal spot to target locations in or on the eye tissue; and a circuit configured to use treatment control data to control the scanner system to move the focal spot in or on the eye tissue to target locations along a processing path defined by the treatment control data to process the curved treatment face in the eye tissue.

According to the present disclosure, the above-mentioned advantages are particularly achieved in that the scanner system has scan capabilities, defined by scan performance characteristics of each particular scan axis, and the electronic circuit is further configured to perform a feasibility check, using the treatment control data and the scan performance characteristics of the plurality of scan axes, prior to processing the curved treatment face in eye tissue; to generate an alarm signal and/or adjust the treatment control data, in case of a negative outcome of the feasibility check, indicating that moving the focal spot along the processing path, defined by the treatment control data, exceeds the scan capabilities of the scanner system, or to use the treatment control data to control the scanner system to process the curved treatment face in the eye tissue, in case of a positive outcome of the feasibility check, indicating that moving the focal spot along the processing path, defined by the treatment control data, does not exceed the scan capabilities of the scanner system. By performing the feasibility check, the electronic circuit checks whether or not moving the focal spot along the processing path, defined by the treatment control data, exceeds the scan capabilities of the scanner system. Thereby, the electronic circuit prevents performing treatments of the eye tissue in cases where moving the focal spot along the processing path, defined by the treatment control data, exceed the scan capabilities of the scanner system, as defined by the scan performance characteristics of the scan axes.

In an embodiment, the circuit is configured to perform the feasibility check by determining scan requirements for processing the curved treatment face, the scan requirements indicating dynamics of moving the focal spot along the processing path, defined by the treatment control data, and comparing the scan requirements to the scan capabilities of the scanner system.

In an embodiment, the scan performance characteristics of at least some of the scan axes include a maximum speed or frequency of a scan movement about the particular scan axis; and the circuit is configured to perform the feasibility check by determining whether moving the focal spot along the processing path, defined by the treatment control data, exceeds the maximum speed or frequency of the scan axes.

In an embodiment, the scan performance characteristics of at least some of the scan axes include a maximum amplitude of a scan movement at a particular speed or frequency of the scan movement; and the circuit is configured to perform the feasibility check by determining whether moving the focal spot along the processing path, defined by the treatment control data, exceeds the maximum amplitude of the scan axes.

In an embodiment, the scan performance characteristics of at least some of the scan axes include a maximum acceleration of a scan movement about the particular scan axis, and/or a maximum speed of the acceleration of the scan movement about the particular scan axis; and the circuit is configured to perform the feasibility check by determining whether moving the focal spot along the processing path, defined by the treatment control data, exceeds the maximum acceleration of the scan movement of the scan axes or the maximum speed of the acceleration of the scan axes.

In an embodiment, the circuit is configured to perform the feasibility check by computing a simulation of moving the focal spot along the processing path, using the treatment control data.

In an embodiment, the circuit is configured to perform the feasibility check by controlling the scanner system, using the treatment control data, while setting the laser source to a deactivated state and/or a reduced energy without any effect to the eye tissue.

In an embodiment, the circuit is configured to adjust the treatment control data by reducing or varying a speed of moving the focal spot along the processing path, to avoid that moving the focal spot along the processing path, defined by the treatment control data, exceeds the scan capabilities of the scanner system.

In an embodiment, the ophthalmological device further comprises a patient interface having a central axis and being configured to fix the focussing optical module on the eye; and the circuit is further configured, in case of a tilt of the eye with respect to the central axis of the patient interface, to adapt the treatment control data to tilt the curved treatment surface corresponding to the tilt of the eye, prior to performing the feasibility check, and use the adapted treatment control data to perform the feasibility check.

In an embodiment, the scanner system is configured to move the focal spot along a spiral-shaped processing path.

In an embodiment, the scanner system comprises a first scan device, configured to move the focal spot with a feed speed along a feed line of the processing path, and the scanner system comprises a second scan device, configured to move the focal spot with a scan speed, which is higher than the feed speed, along a scan line extending transversely with respect to the feed line of the processing path.

In addition to the ophthalmological device for processing a curved treatment face in eye tissue, the present disclosure further relates to a computer program product, particularly, a computer program product comprising a non-transitory computer-readable medium having stored thereon computer program code for controlling a processor of an ophthalmological device for processing a curved treatment face in eye tissue. The ophthalmological device comprises a laser source configured to generate a pulsed laser beam, a focussing optical module configured to make the pulsed laser beam converge onto a focal spot in the eye tissue, and a scanner system with a plurality of scan axes configured to move the focal spot to target locations in the eye tissue, the scanner system having scan capabilities defined by scan performance characteristics of each particular scan axis. The computer program code is configured to control the processor such that the processor: uses treatment control data to control the scanner system to move the focal spot in the eye tissue to target locations along a processing path defined by the treatment control data to process a curved treatment face in the eye tissue; performs a feasibility check, using the treatment control data and the scan performance characteristics of the plurality of scan axes, prior to processing the curved treatment face in eye tissue; and generates an alarm signal and/or adjusts the treatment control data, in case of a negative outcome of the feasibility check, indicating that moving the focal spot along the processing path, defined by the treatment control data, exceeds the scan capabilities of the scanner system, or uses the treatment control data to control the scanner system to process the curved treatment face in the eye tissue, in case of a positive outcome of the feasibility check, indicating that moving the focal spot along the processing path, defined by the treatment control data, does not exceed the scan capabilities of the scanner system.

In an embodiment, the computer program product has computer program code stored on the computer-readable medium and configured to control the processor to perform the feasibility check by determining scan requirements for processing the curved treatment face, the scan requirements indicating the dynamics of moving the focal spot along the processing path, defined by the treatment control data, and comparing the scan requirements to the scan capabilities of the scanner system.

In an embodiment, the computer program product has computer program code stored on the computer-readable medium and configured to control the processor to perform the feasibility check by determining whether moving the focal spot along the processing path, defined by the treatment control data, exceeds a maximum speed or frequency of the scan movement about the scan axes, the scan performance characteristics of at least some of the scan axes including a maximum speed or frequency of a scan movement about the particular scan axis.

In an embodiment, the computer program product has computer program code stored on the computer-readable medium and configured to control the processor to perform the feasibility check by determining whether moving the focal spot along the processing path, defined by the treatment control data, exceeds a maximum amplitude of the scan movement about the scan axes, the scan performance characteristics of at least some of the scan axes including a maximum amplitude of a scan movement at a particular speed or frequency of the scan movement.

In an embodiment, the computer program product has computer program code stored on the computer-readable medium and configured to control the processor to perform the feasibility check by determining whether moving the focal spot along the processing path, defined by the treatment control data, exceeds a maximum acceleration of the scan movement about the scan axes and/or or a maximum speed of the acceleration of the scan movement about the scan axes, the scan performance characteristics of at least some of the scan axes including a maximum acceleration of a scan movement about the particular scan axis and/or a maximum speed of the acceleration of the scan movement about the particular scan axis.

In an embodiment, the computer program product has computer program code stored on the computer-readable medium and configured to control the processor to perform the feasibility check by computing a simulation of moving the focal spot along the processing path, using the treatment control data.

BRIEF DESCRIPTION OF THE DRAWINGS

The present disclosure will be explained in more detail, by way of example, with reference to the drawings in which.

DETAILED DESCRIPTION OF THE EMBODIMENTS

Figure 1:
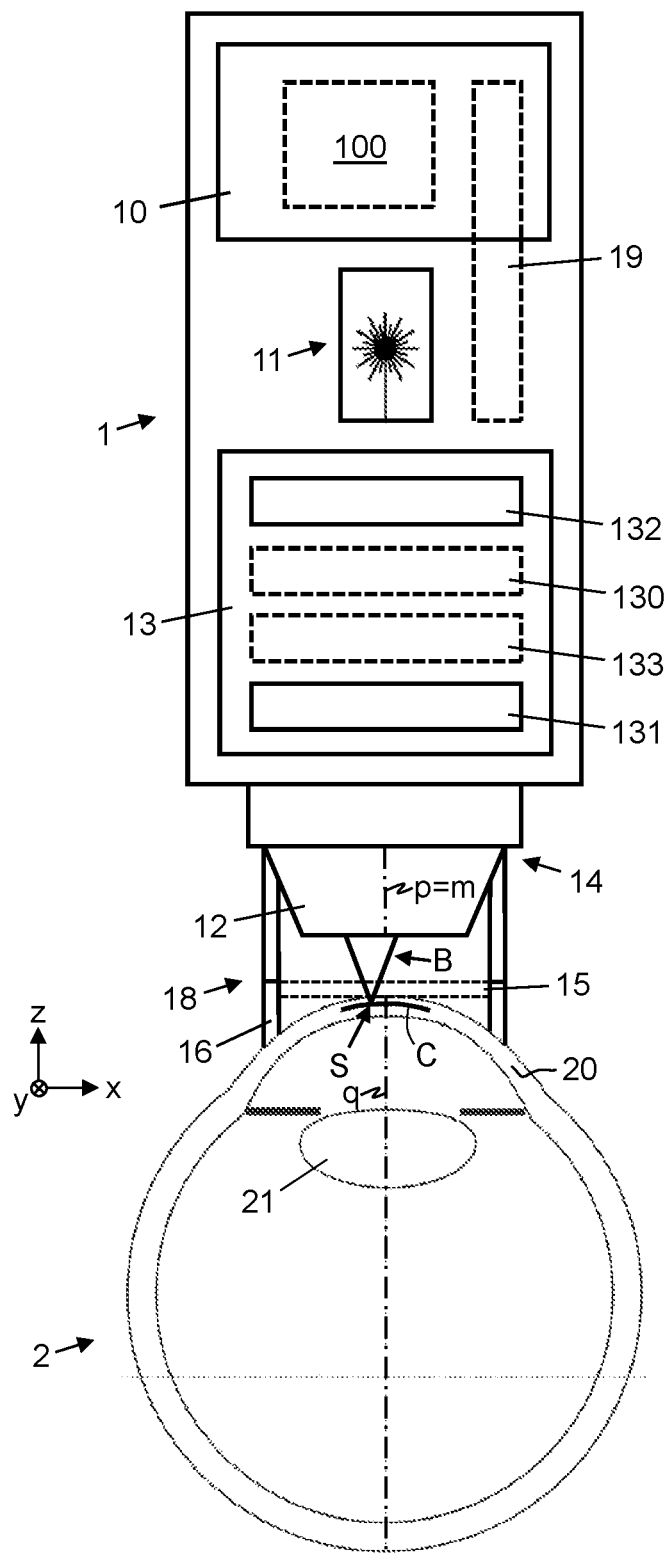
FIG. 1 shows a block diagram that schematically illustrates an ophthalmological device for processing a curved treatment face in eye tissue with a pulsed laser beam, said device comprising a focusing optical module for focusing the pulsed laser beam, and a scanner system for moving the focal spot to target locations in or on the eye tissue.

In FIG. 1, reference numeral 1 relates to an ophthalmological device for processing a curved treatment face C in eye tissue using a pulsed laser beam B. The eye tissue comprises the cornea 20, the lens 21, or other tissue of the eye 2. Specifically, the ophthalmological device 1 is configured to process the curved treatment face C for irradiating the eye issue or for cutting the eye tissue, whereby in the latter case the curved treatment face C constitutes a curved incision face C. The person skilled in the art will understand that by generating two or more curved incision faces C, it is possible to cut three-dimensional tissue pieces, e.g. lenticular tissue pieces, which can be removed from the eye, e.g. a lenticular tissue piece of the cornea 20 which is removed from within the cornea 20 for refractive correction of the cornea 20. The person skilled in the art will further understand that by (partially) overlaying several curved treatment faces C or curved incision faces C, respectively, it is possible to achieve three-dimensional volume treatment of the eye tissue, e.g. for generating a void volume R inside the cornea 20, as illustrated schematically in FIG. 4, for refractive correction of the cornea 20 and/or for other purposes, such as for inserting implants into the cornea 20.

As illustrated schematically in FIG. 1, the ophthalmological device 1 comprises a laser source 11 for generating the pulsed laser beam B, a focusing optical module 12 for focusing the pulsed laser beam B onto a focal spot S in or on the eye tissue, and a scanner system 13 for moving the focal spot S to target locations in and/or on the eye tissue.

The ophthalmological device 1 further comprises an electronic circuit 10 for controlling the laser source 11 and the scanner system 13. The electronic circuit 10 implements a programmable control device and comprises e.g. one or more processors 100 with program and data memory and programmed software modules for controlling the processors 100, and/or other programmable circuits or logic units such as ASICs (application specific integrated circuits) or the likes.

The laser source 11 comprises a femtosecond laser for producing femtosecond laser pulses, which have pulse widths of typically 10 fs to 1000 fs (1 fs=$10^{-15}$ s). The laser source 11 is arranged in a separate housing or in a housing shared with the focusing optical module 12.

The focusing optical module 12 is configured to focus the pulsed laser beam B or the laser pulses, respectively, onto a focal spot S in or on the eye tissue, i.e. for making the pulsed laser beam B converge to a focus or focal spot in or on the eye tissue. The focusing optical module 12 comprises one or more optical lenses. In an embodiment, the focusing optical module 12 comprises a focus adjustment device for setting the focal depth of the focal spot S, for example one or more movable lenses, in the focusing optical module 12 or upstream of the focusing optical module 12, or a drive for moving the entire focusing optical module 12 along the projection axis p (z-axis). By way of example, the focusing optical module 12 is installed in an application head 14, which can be placed onto the eye 2. The person skilled in the art will understand that in cases where the focusing optical module 12 is adjusted (focus) or moved as part of the scanning process or scanning actuation, the focusing optical module 12 and associated drives can be viewed and considered as parts of the scanner system 13.

As illustrated schematically in FIG. 1, the ophthalmological device 1 comprises a patient interface 18 for attaching the application head 14 or the focusing optical module 12, respectively, onto the eye 2. Depending on the embodiment, the patient interface 18 is connected to the application head 14 in a fixed or removable manner. The patient interface 18 comprises an optional contact body 15 and one or more suction elements configured to fix the contact body 15 and thus the patient interface 18 to the cornea 20. For example, the one or more suction elements are arranged in a fastening ring 16, e.g. a vacuum-controlled suction ring, whereby the one or more suction elements are connected fluidically to a suction pump. The contact body 15, also referred to as applanation body, is at least partly light-transparent. In the state where the patient interface 18 or the contact body 15, respectively, is fixed to the cornea 20, the cornea 20 is applanated where the contact body 15 is in contact with the exterior (anterior) surface of the cornea 20.

In an embodiment, the ophthalmological device 1 further comprises a measurement system 19 configured to determine positional reference data of the cornea 20. Depending on the embodiment, the measurement system 19 comprises a video capturing system, an optical coherence tomography (OCT) system, and/or a structured light illumination system. Accordingly, the measurement data or positional reference data determined by the measurement system 19 includes video data, including top view data (comprising two-dimensional images), and/or OCT data of the cornea 20 (comprising three-dimensional tomography data). The measurement system 19 is configured to determine the positional reference data of the cornea 20 also in an applanated state of the cornea 20. The measurement system 19 is connected to and/or integrated with the electronic circuit 10, which is further configured to control the scanner system 13, using the positional reference data from the measurement system 19.

Aside from the optional the positional reference data from the measurement system 19, the electronic circuit 10 is configured to use treatment control data to control the scanner system 13 to move the focal spot S in or on the eye tissue to target locations along a processing path t defined by the treatment control data to process the curved treatment face C in and/or on the eye tissue. The treatment control data is stored in the data memory and/or data store of the electronic circuit 10 and/or received via a communication link from a separate computer system.

Essentially, the treatment control data defines the processing path t along which the scanner system 13 is to move the focal spot S for processing the curved treatment face C in the eye tissue. In effect, the treatment control data or the processing path t, respectively, define a sequence of consecutive target locations in a three-dimensional x/y/z-space for processing a three-dimensional curved treatment face C in eye tissue. Depending on the embodiment and/or configuration, for defining the processing path t, the treatment control data comprises path definition data, e.g. coordinates, positions, positional references, etc., and/or path processing data, e.g. instructions, operations, and/or procedures for the scanner system 13 and its components, described below in more detail. As illustrated schematically in FIG. 2, 3 or 6, the processing path t can be defined as a simple trajectory for the focal spot S to be moved along by the scanner system 13 for processing the curved treatment face C; or, as illustrated schematically in FIGS. 4 and 7, the processing path t can be defined as a composite trajectory, e.g. comprising a feed line w and a scan line r, extending transversely with respect to the feed line w, for the focal spot S to be moved along by the scanner system 13 for processing the curved treatment face C. The treatment control data comprises further control data for controlling the laser source 11 and the scanner system 13, e.g. processing speed, pulse rate, pulse energy, etc.

Processing the curved treatment face C imposes scan requirements that must be met by a scanner system 13. More specifically, the scan requirements are determined by the dynamics involved in moving the focal spot S along the processing path t, defined by the treatment control data, for processing the curved treatment face C. The dynamics include the speed with which a focal spot is to be placed and moved along the processing path and the distances that must be covered by the focal spot within a given time, at a defined speed, with a defined acceleration, and/or with a defined speed of acceleration (jerk/jump).

Figure 8:
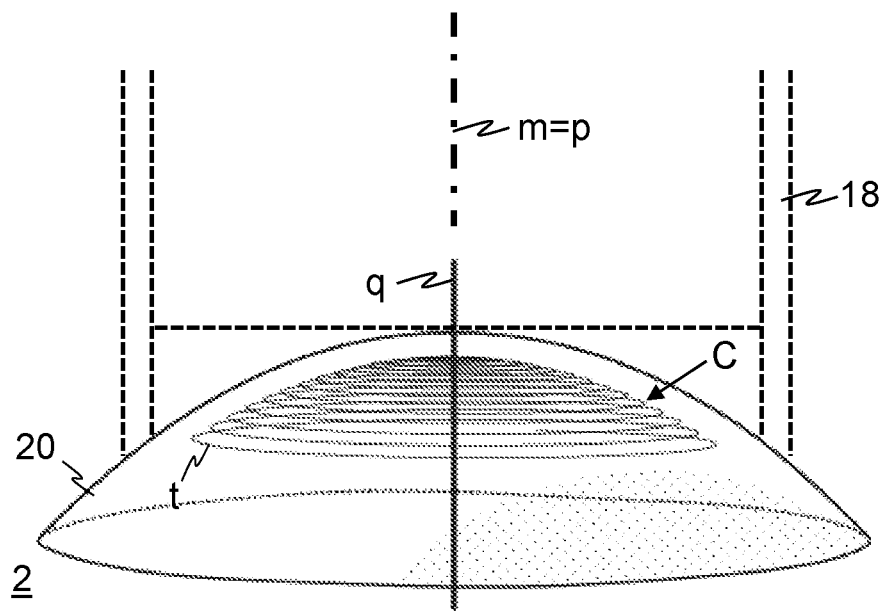
FIG. 8 shows a schematic three-dimensional view of a curved treatment face in the eye tissue, whereby the eye and a patient interface are aligned.
Figure 9:
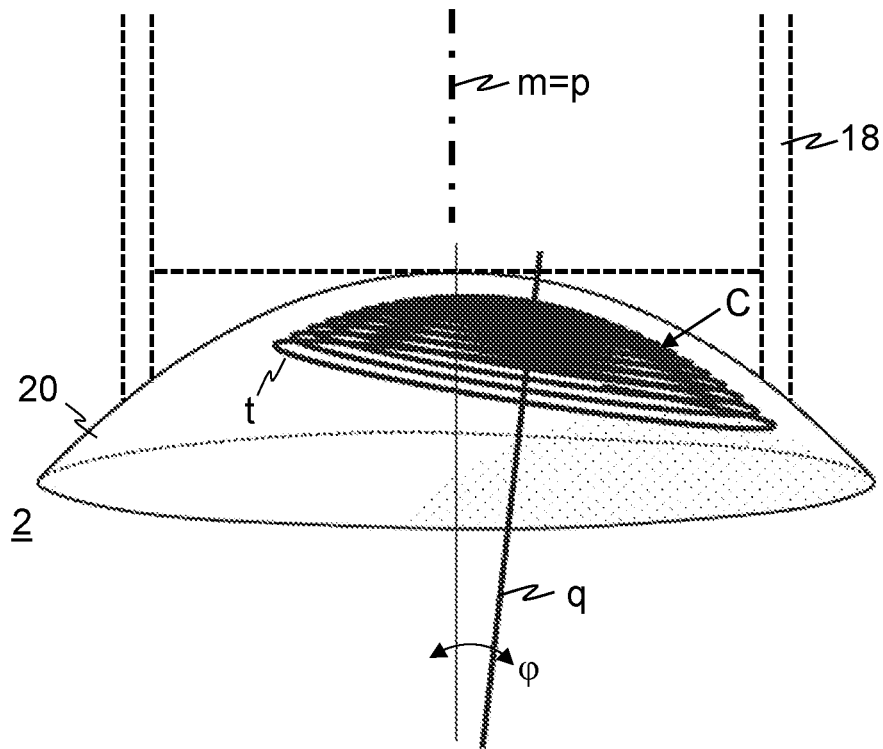
FIG. 9 shows a schematic three-dimensional view of a curved treatment face in the eye tissue, whereby the eye is tilted with respect to the patient interface (or vice versa).
Figure 10:
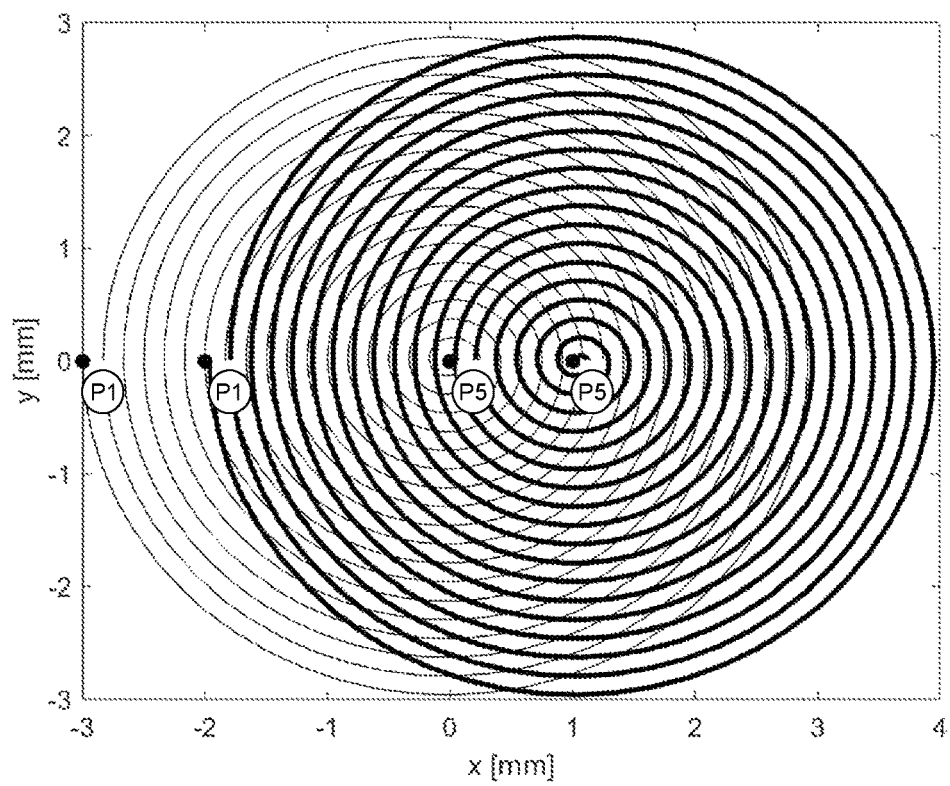
FIG. 10 shows a schematic top view of two spiral shaped processing paths for processing the curved treatment face of FIGS. 8 and 9, the thin line indicating the processing path when the eye and a patient interface are aligned, the bold line indicating the processing path when the eye is tilted with respect to the patient interface.
Figure 11:
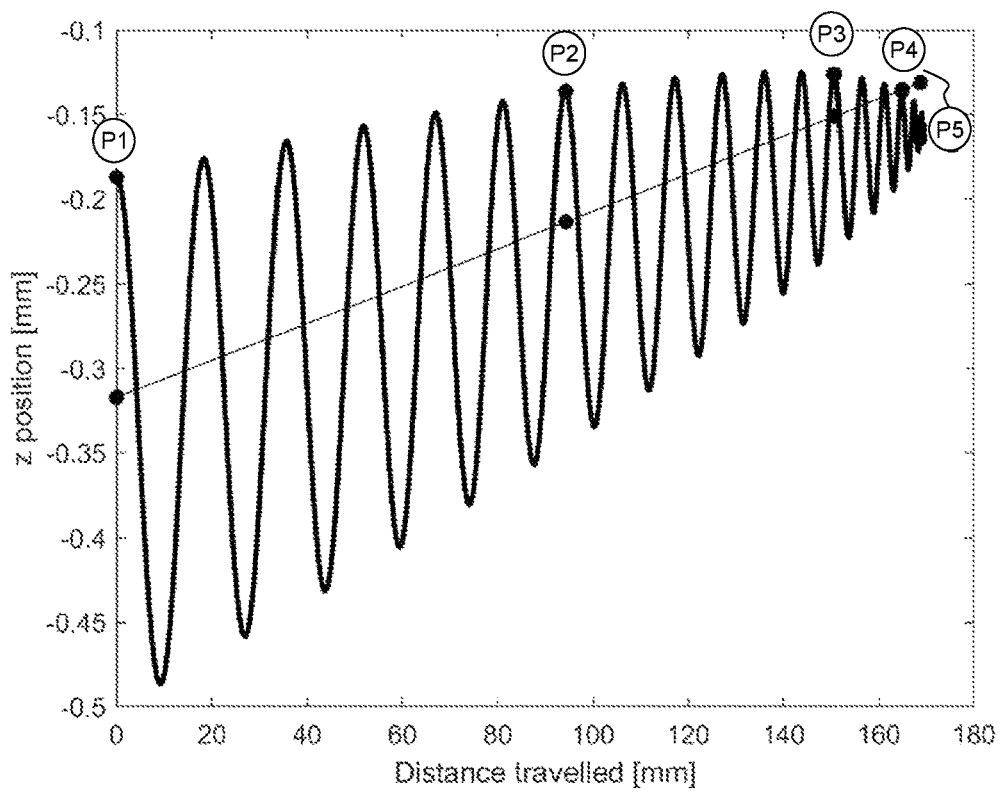
FIG. 11 shows a graph illustrating the depth (z-position) of the focal spot when moved along the spiral shaped processing paths of FIG. 10, the thin line indicating a linear decrease of the depth of the focal spot with distance travelled when the eye and a patient interface are aligned, the bold line indicating an oscillating depth of the focal spot with distance travelled when the eye is tilted with respect to the patient interface.
Figure 12:
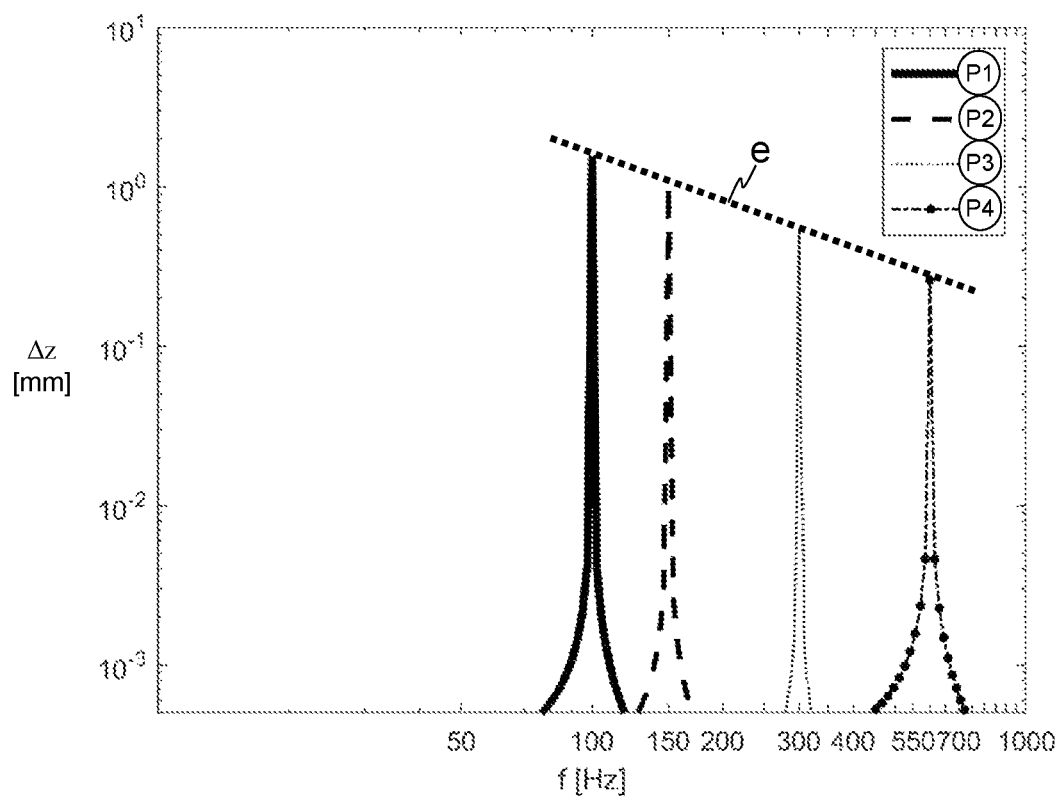
FIG. 12 shows a graph illustrating the scan requirements of moving the focal spot along the processing path for the case depicted in FIGS. 9, 10, and 11, when the eye is tilted with respect to the patient interface, depicting the required focus shift in specific positions on the processing path.

For example, FIGS. 11 and 12 illustrate the scan requirements of moving the focal spot S along the processing path t for processing the curved treatment face C shown in FIG. 9. As illustrated schematically in FIG. 9, the eye 2 is tilted with respect to the patient interface 18, i.e. the central axis q of the eye 2 is not aligned with the central axis m of the patient interface 18, but is transverse to the central axis m with a tilting angle φ. Accordingly, in the tilted eye 2 shown in FIG. 9, the curved treatment face C, which is to be positioned and processed in the eye tissue as illustrated in FIG. 8 for the non-tilted eye 2, and correspondingly the processing path t are rearranged with respect to the patient interface 18, as illustrated in FIG. 9. FIG. 10 shows the spiral shaped processing path t as a thin line for processing the curved treatment face C of the non-tilted eye 2 of FIG. 8, and as a bold line for processing the curved treatment face C of the tilted eye 2 of FIG. 9. As a consequence of the tilting of the eye 2 and thus the curved treatment face C, the focal depth of the focal spot S, i.e. its z-position, oscillates when it is moved along the processing path t, from the outside to the inside of the spiral, as illustrated in FIG. 11 with the bold line. This is contrary to the situation of the non-tilted eye 2 of FIG. 8 where the focal depth z of the focal spot S decreases continuously and linearly when it is moved along the processing path t, from the outside to the inside of the spiral, as illustrated in FIG. 11 with the thin line. FIG. 12 illustrates the scan requirements for selected positions P1, P2, P3, P4 on the tilted processing path t of FIG. 9, as also illustrated in FIG. 11 on the travelled distance of the tilted processing path t. FIG. 12 illustrates for the positions P1, P2, P3, P4 on the processing path t the required amplitude Δz of the oscillation of focal depth of the focal spot S at the respective frequency f with which the spiral of the processing path t orbits the spiral's center. In other words, FIG. 12 illustrates the scan requirements for processing the tilted curved treatment face C of FIG. 9 in terms of required amplitudes of z-oscillation for spiral frequencies f of the processing path t. In FIG. 12, envelope e thus indicates the scan requirements as frequency characteristics with required amplitudes of z-oscillation depending on the spiral frequency f of the processing path t.

Figure 13:
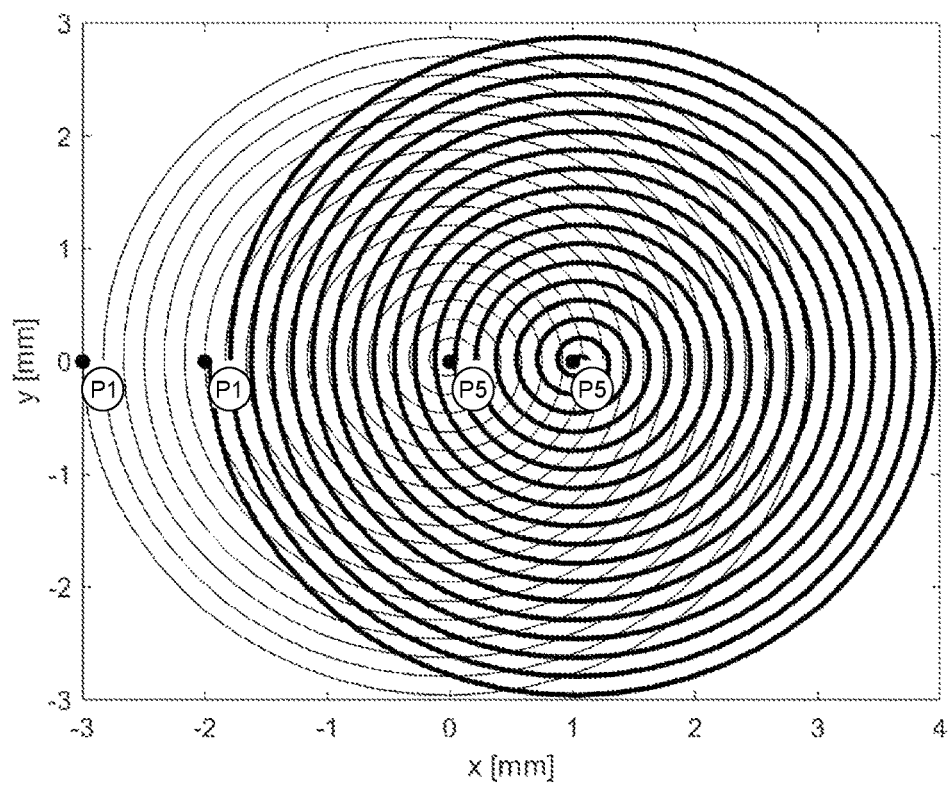
FIG. 13 shows a schematic top view of two spiral shaped processing paths for processing a curved treatment face, assuming a more irregular surface than the curved treatment face depicted in FIGS. 8 and 9, the thin line indicating the processing path when the eye and a patient interface are aligned, the bold line indicating the processing path when the eye is tilted with respect to the patient interface.
Figure 14:
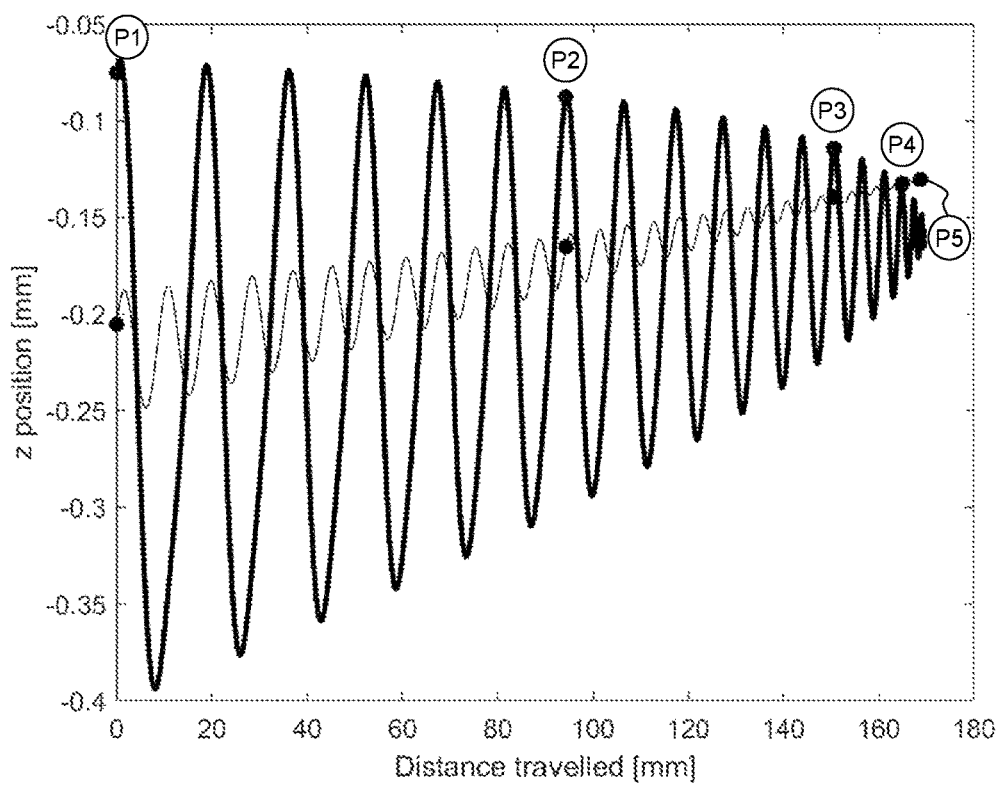
FIG. 14 shows a graph illustrating the depth (z-position) of the focal spot when moved along the spiral shaped processing paths of FIG. 13, the thin line indicating a weakly oscillating depth of the focal spot, owing to the irregular surface of the curved treatment face, with distance travelled when the eye and a patient interface are aligned, the bold line indicating a strongly oscillating depth of the focal spot with distance travelled when the eye is tilted with respect to the patient interface.
Figure 15:
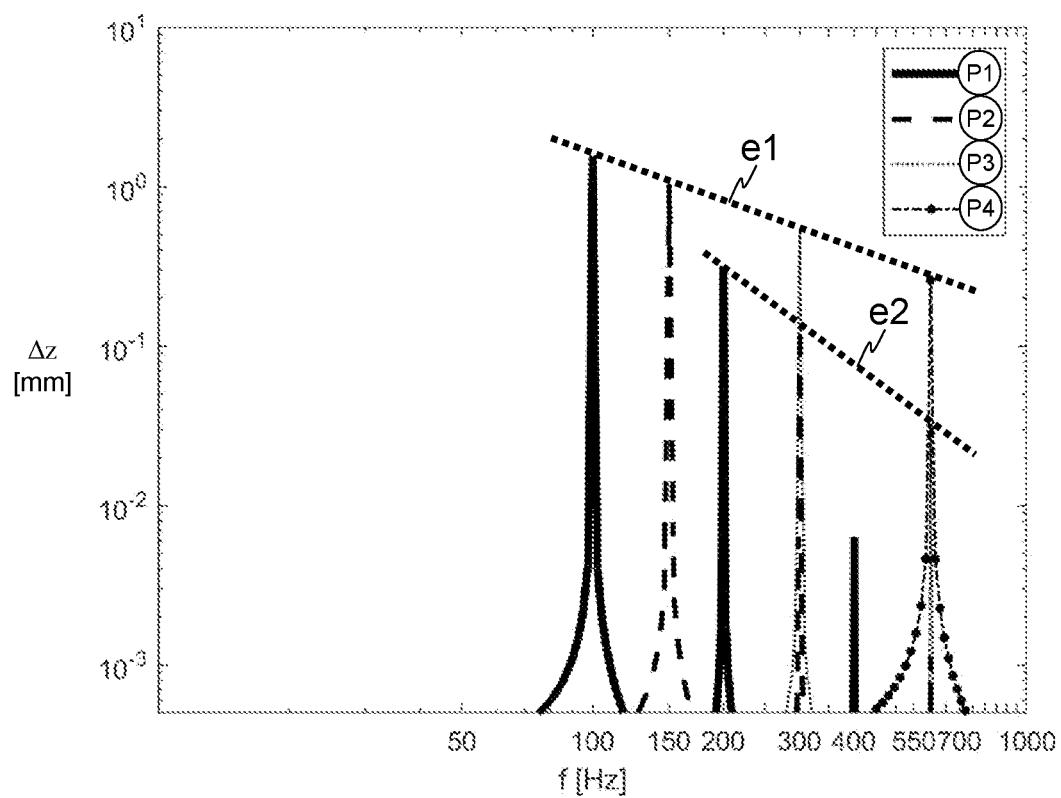
FIG. 15 shows a graph illustrating the scan requirements of moving the focal spot along the processing path for the case depicted in FIG. 14, when the eye is tilted with respect to the patient interface, depicting the required focus shift in specific positions on the processing path.

Likewise, FIGS. 14 and 15 illustrate the scan requirements of moving the focal spot S along the processing path t for processing a tilted irregular curved treatment face C as shown in FIG. 9, but with a more irregular (brumby, dented) surface than shown in FIG. 9. FIG. 13 shows the spiral shaped processing path t as a thin line for processing the irregular curved treatment face C of a non-tilted eye 2, and as a bold line for processing the irregular curved treatment face C of the tilted eye 2. Because of the (assumed) irregular surface of the curved treatment face C, the focal depth of the focal spot S, i.e. its z-position, also oscillates for the untilted eye 2 when the focal spot S is moved along the processing path t from the outside to the inside of the spiral, as illustrated with the thin line in FIG. 14. FIG. 15 illustrates the scan requirements for selected positions P1, P2, P3, P4 on the tilted processing path t of FIG. 13, as also illustrated in FIG. 14 on the travelled distance of the tilted processing path t. FIG. 15 illustrates for the positions P1, P2, P3, P4 on the processing path t the required amplitude Δz of the oscillation of focal depth of the focal spot S at the respective frequency f with which the spiral of the processing path t orbits the spiral's center. In other words, FIG. 15 illustrates the scan requirements for processing the tilted irregular curved treatment face C of FIG. 13 in terms of required amplitudes of z-oscillation for spiral frequencies f of the processing path t. In FIG. 15, envelopes e1 and e2 thus indicate the scan requirements as frequency characteristics with required amplitudes of z-oscillation depending on the spiral frequency f of the processing path t.

Figure 17:
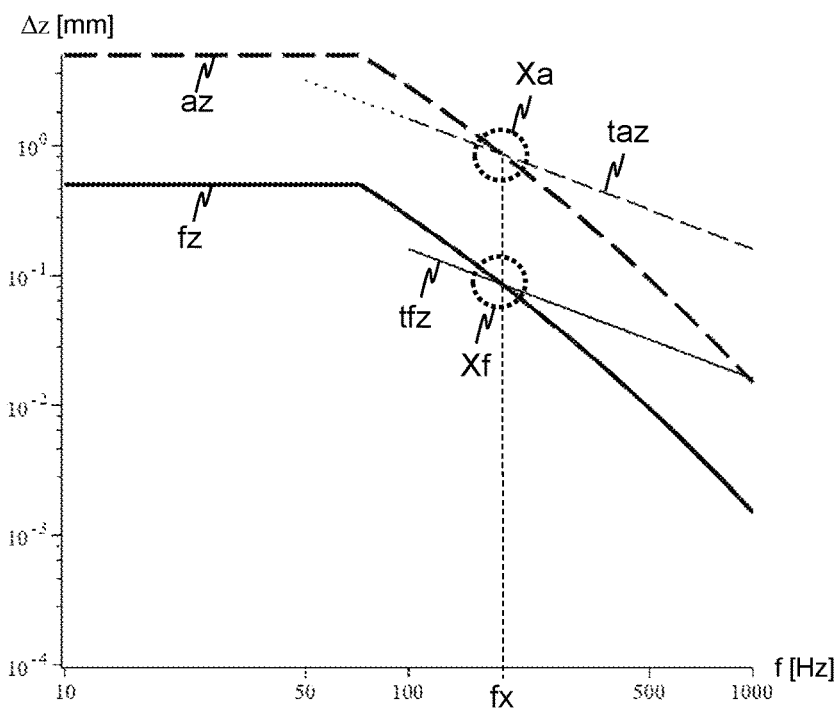
FIG. 17 shows a graph illustrating a comparison of the frequency characteristics of a zoom system or z-modulator, and the scan requirements of moving the focal spot along a defined processing path for processing a curved treatment face.

As a further example, in FIG. 17, curves taz and tfz illustrate the scan requirements for processing the curved treatment face C of FIG. 8 in terms of required amplitudes Δz of z-oscillation for spiral frequencies f of the processing path t with a double-logarithmic scale. Curve taz indicates the required amplitudes Δz of the movement of the actuated optics of an electromechanical zoom system or a z-modulator 133. Curve tfz indicates the required amplitudes Δz of the focal shift (of the focal spot S) generated by the actuated optics.

The scanner system 13 is configured to move the focal spot S to target locations in or on the eye tissue by guiding and directing the pulsed laser beam B and thus the focal spot S to target locations in or on the eye tissue.

Figure 5:
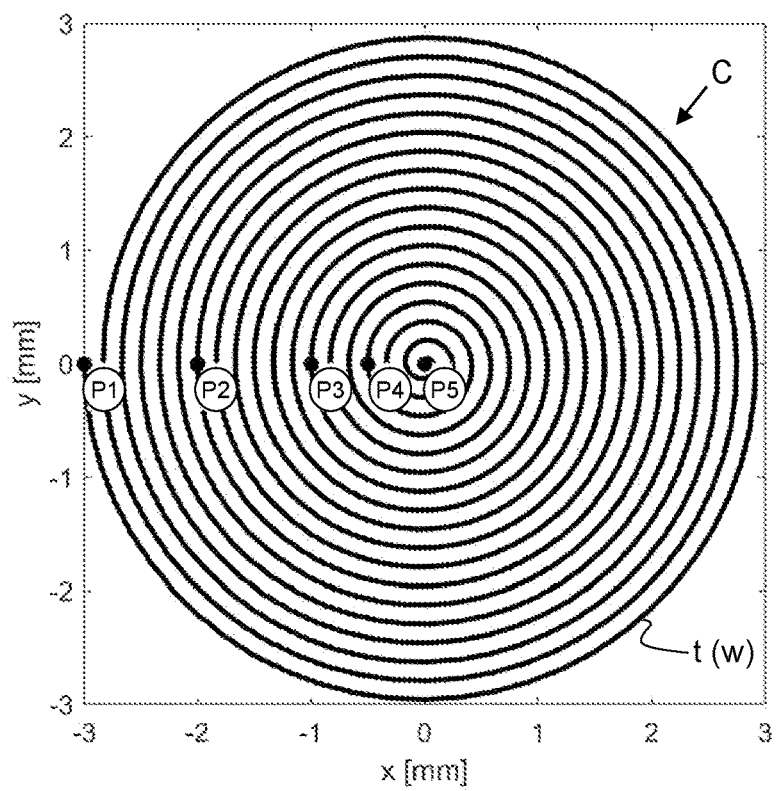
FIG. 5 shows a schematic top view of a spiral shaped processing path for processing a curved treatment face in eye tissue.
Figure 6:
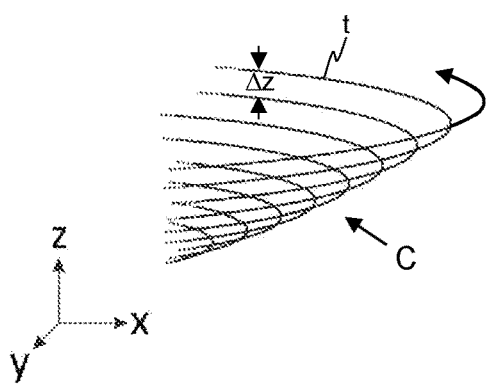
FIG. 6 shows a schematic three-dimensional view of a section of a spiral shaped processing path for processing a curved treatment face in eye tissue.

The scanner system 13 comprises one or more scanner devices 131, also referred to as slow scanner device, configured to guide and direct the pulsed laser beam B and thus the focal spot S along processing path t or a feed line w thereof, e.g. a spiral shaped feed line w, in a x/y-work-plane which is normal to a z-axis, whereby the z-axis is aligned with or essentially parallel to the projection axis p of the focusing optical module 12, as illustrated schematically in FIG. 1. Depending on the embodiment, the one or more scanner devices 131 comprise one or more actuators configured to move the focusing optical module 12 such that the focal spot S is moved along the processing path t or the feed line w in the x/y-work-plane, and/or one or more deflection mirrors, each movable about one or two axes, configured to deflect the pulsed laser beam B and/or the laser pulses such that the focal spot S is moved along the processing path t or the feed line w in the x/y-work-plane. To move the focal spot S along a processing path t or a feed line w in the three-dimensional x/y/z-space, e.g. a spiral shaped processing path t or feed line w in the three-dimensional x/y/z-space, the one or more scanner devices 131 comprise one or more actuators configured to move the focusing optical module 12 or one or more of its optical lenses in z-direction, i.e. along the z-axis. FIG. 5 illustrates schematically in top view a spiral shaped processing path t or feed line w for processing the curved treatment face C, e.g. in the cornea 20. FIG. 6 shows a schematic three-dimensional view of a section of a spiral shaped processing path t or feed line w for processing the curved treatment face C, e.g. in the cornea 20.

In an embodiment with a composite processing path t, the scanner system 13 comprises one or more further scanner devices 132, also referred to as fast scanner devices, configured to guide and direct the pulsed laser beam B and thus the focal spot S along a scan line r at a scanning speed that is comparatively faster than the scanning speed of the aforementioned slow scanner device 131. For example, the fast scanner device 132 comprises a polygon scanner. The fast scanner device 132 is configured to move the focal spot S, overlaid on the movement along the feed line w, along a scan line r that runs transversal to the feed line w, in other words, it runs through the feed line w, at an angle to the feed line w, as illustrated in FIG. 7.

In an embodiment, the scanner system 13 further comprises a divergence-modulator 133, also referred to as z-modulator, configured to move the focal spot S along the z-axis which is aligned with or essentially parallel to the projection axis p of the focusing optical module 12. The divergence modulator 133 is configured to dynamically change the divergence of the pulsed laser beam B. As illustrated schematically in FIG. 7, the combined (synchronized) movement of the focal spot S by the aforementioned fast scanner device 132 and by the divergence-modulator 133 constitutes a movement of the focal spot S along a scan line r, which is bent and/or tilted with a tilting angle $\alpha$ from the x/y-plane, as indicated in FIG. 7. The electronic circuit 10 is configured to control the divergence-modulator 133 to adjust the tilting angle $\alpha$ of the scan line r with respect to the shape of the curved treatment face C to be processed.

In an embodiment, the scanner system 13 further comprises an optional length modulator 130 configured to modulate the length d of the scan line r. For example, the length modulator 130 comprises an adjustable shutter device arranged downstream of the fast scanner device 132. For example, the length d of the scan line r is adjusted by controlling the length modulator 130, e.g. the shutter device, to let through a set number of laser pulses from the fast scanner device 132 for producing a corresponding number of focal spots S. The electronic circuit 10 is configured to control the length modulator 130 to adjust the length d of the scan line r with respect to the shape of the curved treatment face C to be processed, as illustrated schematically in FIG. 7.

Figure 2:
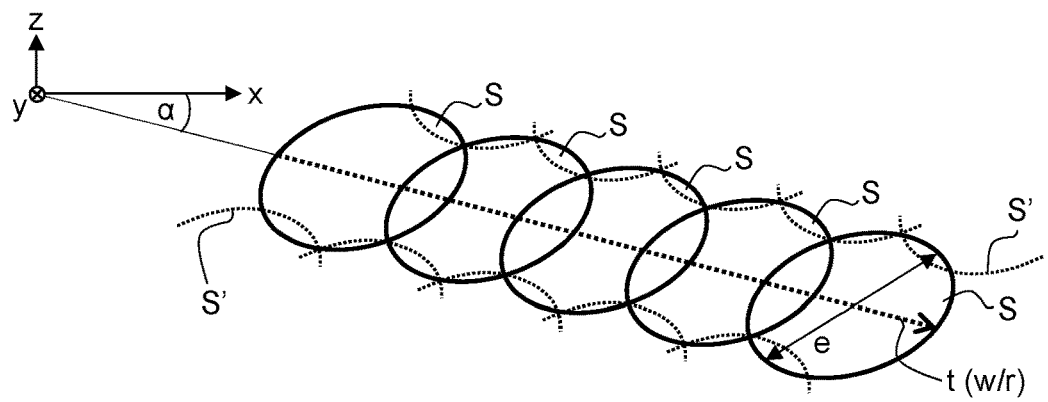
FIG. 2 shows a schematic top view of a processing path with a series of partially overlapping focal spots moved by the scanner system along the processing path.
Figure 3:
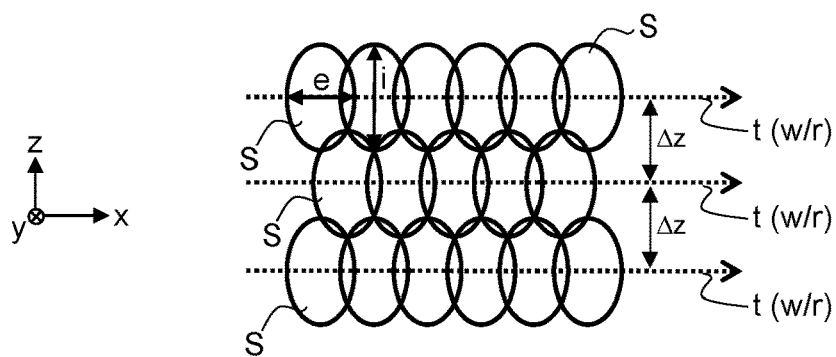
FIG. 3 shows a schematic cross-sectional view of superposed processing paths with focal spots moved by the scanner system along the processing paths, whereby the focal spots partial overlap along the processing paths and across the superposed processing paths.
Figure 4:
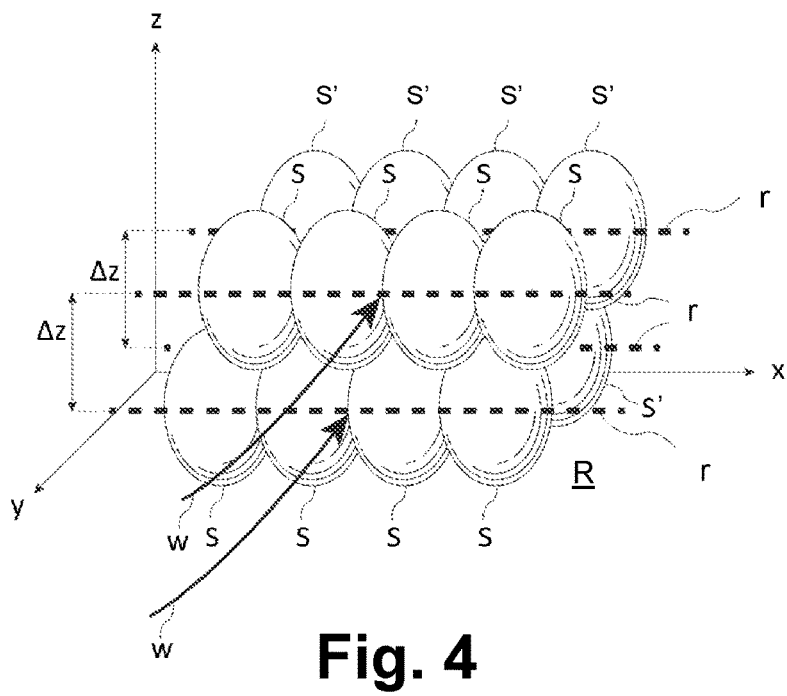
FIG. 4 shows a schematic three-dimensional view of volume treatment with a composite processing path having focal spots partially overlapping along scan lines, across neighbouring scan lines moved along a feed line, and across superposed scan lines moved along the feed line.
Figure 7:
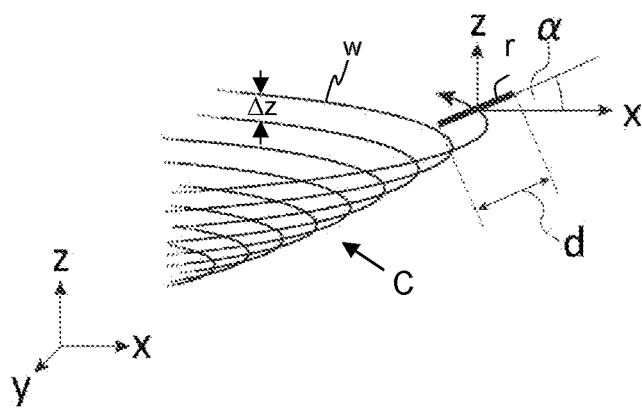
FIG. 7 shows a schematic three-dimensional view of a section of composite processing path, with a spiral shaped feed line and an overlaid scan line, for processing a curved treatment face in eye tissue.

The synchronized combination of the movement of the focal spots S along the feed line w in the x/y/z-space by the slow scanner device 131, with the overlaid movement of the focal spots S along the scan line r by the fast scanner device 132, and the tilting of the scan line r with a tilting angle $\alpha$ from the x/y-plane by the divergence-modulator 133, and optionally the adjustment of the length d of the scan line r by the length modulator 130, as illustrated in FIG. 7, makes it possible not only to process a curved treatment face C inside the eye tissue, e.g. to generate curved incision faces inside the cornea 20, but also to perform with great flexibility volumetric treatment of the eye tissue, e.g. volumetric ablation of corneal tissue. For example, volumetric treatment is achieved inside the eye tissue by driving the scan line r overlaid on the feed line w with a continuous increase $\Delta z$ in z-direction (e.g. per cycle of a spiral shaped feed line w) to generate superposed treatment layers with partially overlapping focal spots S along the processing path, feed line, and scan line r (as illustrated in FIGS. 2 to 4), among neighbouring segments of the processing path t or the feed line w, and neighbouring scan lines r (as illustrated in FIGS. 2 and 4), and among adjacent superposed treatment layers or segments of the processing path t or the feed line w, and neighbouring scan lines r, respectively (as illustrated in FIGS. 3 and 4).

Various further and more specific embodiments of the scanner system 13 are described by the applicant in patent applications US 2019/0015250, US 2019/0015251, and US 2019/0015253 which are hereby incorporated by reference.

As outlined above, for moving the focal spot S to target locations in or on the eye tissue, the scanner system 13 has a plurality of scan axes, explained in more detail below. For moving the focal spot S along the processing path t to process the curved treatment face C, the electronic circuit 10 controls in a synchronized fashion the actuation associated with the plurality of scan axes of the scanner system 13. In other words, the electronic circuit 10 is configured for synchronized control of the actuation of all scan axes of the scanner system 13 involved in moving the focal spot S along the processing path t to process the curved treatment face C.

The plurality of scan axes of the scanner system 13 determine the scan capabilities of the scanner system 13, i.e. the dynamic extent and capacity of scan actuation at the system level. More specifically, each of the scan axes of the scanner system 13 has scan performance characteristics, i.e. the dynamic extent and capacity of scan actuation at the device or component level. The scan performance characteristics of the scan axes determine the overall scan capabilities of the scanner system 13. The scan performance characteristics of the scan axes depend on the type of scanner device or component of the scanner system 13 with which the respective scan axis is associated, e.g. various scanner devices 131, 132, divergence-modulators 133, z-modulators 133, length-modulators 130, shutters, etc. More specifically, the scan performance characteristics of the scan axes depend on the type of actuation performed by the different scanner devices and further components of the scanner system 13.

For a scanner device 131, 132 of the scanner system 13, e.g. a rotational or oscillating scanner configured to rotate a deflection mirror about a rotational (scan) axis, the scan characteristics of the scan axis include the maximum speed and/or frequency of the scan movement about the particular scan axis, the maximum amplitude of the scan movement at a particular speed or frequency of the scan movement, the maximum acceleration of the scan movement, and/or the maximum speed of the acceleration of the scan movement.

Figure 16:
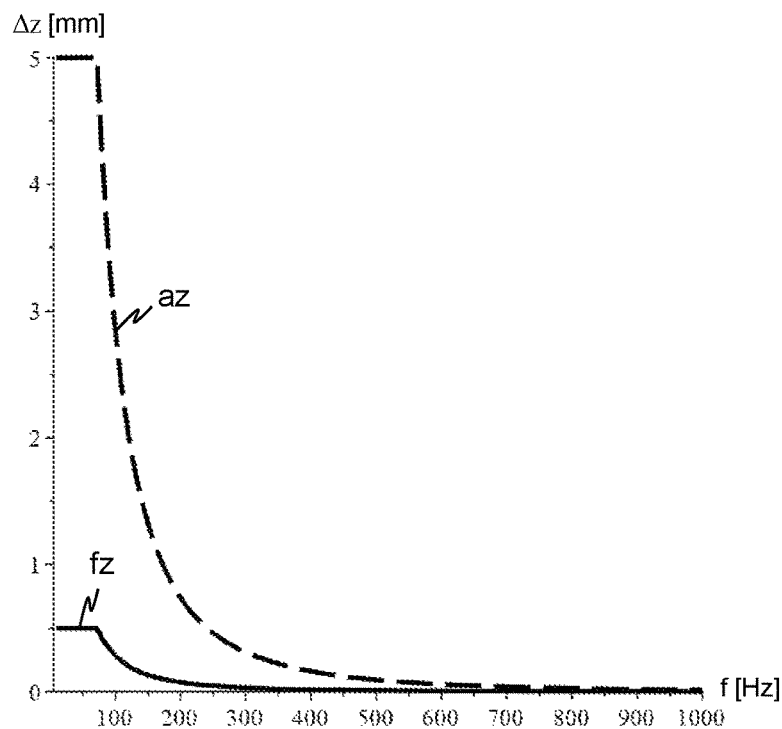
FIG. 16 shows a graph illustrating the frequency characteristics of a zoom system or z-modulator, depicting the movement of the actuated optics and the focus shift caused by this actuation, depending on the frequency of actuation.

Similarly, for a zoom system, a divergence-modulator or z-modulator 133, configured to move the focal spot S along the projection axis p (depending on the alignment in z-direction), the scan characteristics of the scan axis include the maximum speed and/or frequency of the scan movement along the projection axis p, the maximum amplitude of the scan movement at a particular speed or frequency of the scan movement, the maximum acceleration of the scan movement, and/or the maximum speed of the acceleration of the scan movement. For example, FIG. 16 illustrates an example of the frequency characteristics of an electromechanical zoom system or a z-modulator 133, indicating on the horizontal axis the frequency f (or speed) of the actuation in Hz, and on the vertical axis the distance $\Delta z$ in mm actuated at the respective frequency f, whereby curve az indicates the actual distance $\Delta z$ of the movement of the actuated optics, whereas curve fz indicates the distance $\Delta z$ of the movement of focus caused by this actuation of the optics. Curves az and fz are further illustrated in FIG. 17 with a double-logarithmic scale.

For a length modulator or shutter device 130, configured to modulate the length of the scan line r, the scan characteristics of the scan axis include the maximum speed and/or frequency of the scan movement with which the length of the scan line r can be adjusted, the maximum amplitude of the scan movement with which the length of the scan line r can be adjusted at a particular speed or frequency of the scan movement, the maximum acceleration of the scan movement, and/or the maximum speed of the acceleration of the scan movement.

For a tilt actuator, configured to tilt the focussing optical module 12 for adjusting the angular orientation of the projection axis p, the scan characteristics of the scan axis include the maximum speed and/or frequency of the scan movement with which the angular orientation of the projection axis p can be adjusted, the maximum amplitude of the scan movement with which the angular orientation of the projection axis p can be adjusted at a particular speed or frequency of the scan movement, the maximum acceleration of the scan movement, and/or the maximum speed of the acceleration of the scan movement.

For the sake of simplicity and completeness, the above mentioned examples and further actuation elements of the scanner system 13 that can be associated with a speed or frequency of actuation, an amplitude or extent of actuation, an acceleration of actuation, and/or a speed of the acceleration of actuation, are also associated with a scan axis and respective scan performance characteristics even though the particular actuation elements may not have an inherent mechanical axis but rather a virtual or mathematical axis.

The plurality of scan axes of the scanner system 13 determine the scan capabilities of the scanner system 13, i.e. the dynamic extent and capacity of scan actuation at the system level. More specifically, each of the scan axes of the scanner system 13 has scan performance characteristics, i.e. the dynamic extent and capacity of scan actuation at the device or component level, and the scan performance characteristics of the scan axes determine the overall scan capabilities of the scanner system 13.

The electronic circuit 10 is configured to perform a feasibility check, prior to processing the curved treatment face C in the eye tissue. By performing the feasibility check, the electronic circuit 10 determines whether or not the scan requirements needed for processing the curved treatment face C exceed the scan capabilities of the scanner system 13.

Figure 18:
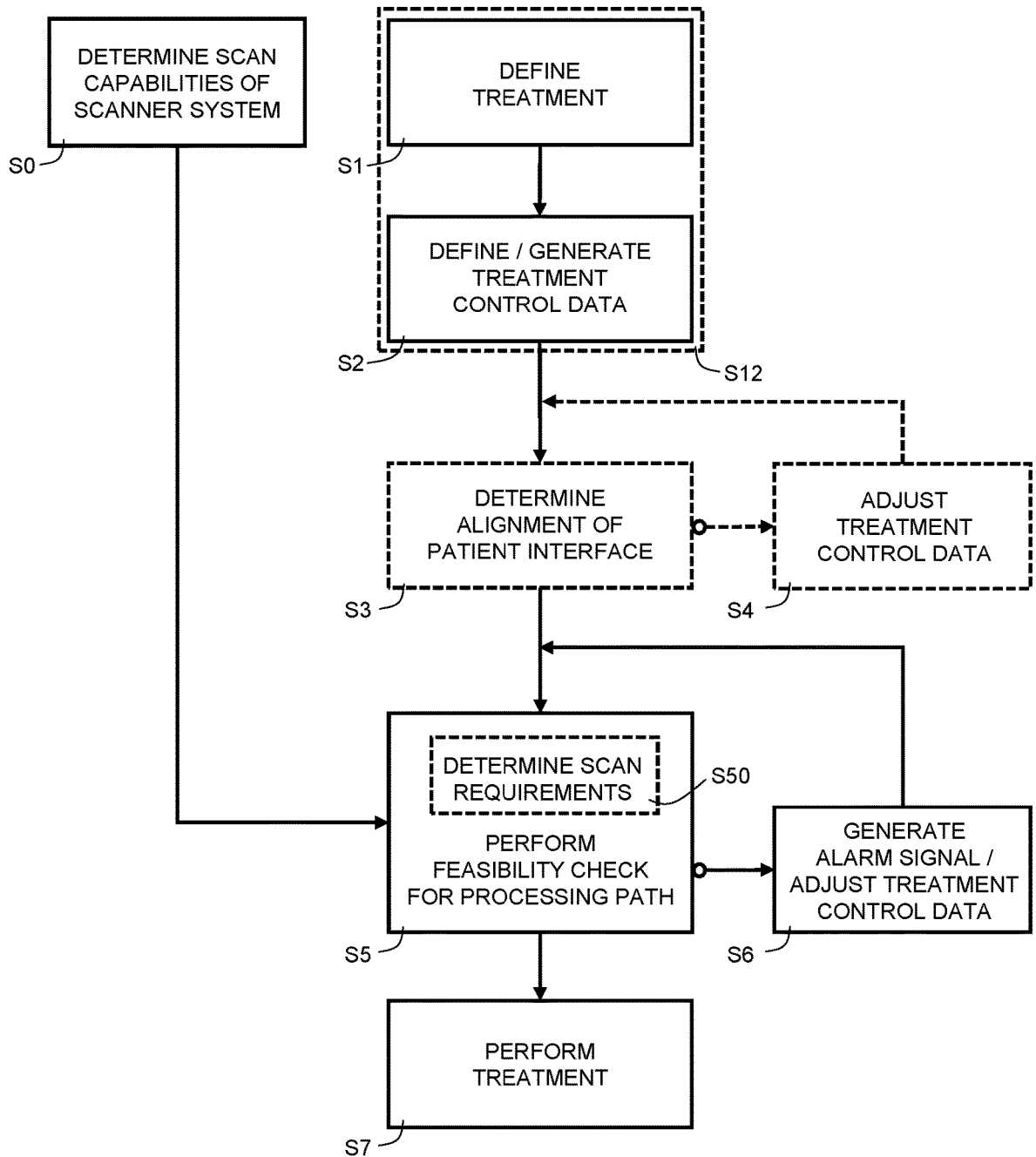
FIG. 18 shows a flow diagram illustrating an exemplary sequence of steps for processing a curved treatment face in eye tissue, whereby a feasibility check is performed prior to performing the treatment.

In the following paragraphs, described with reference to FIG. 18 are possible steps performed by the electronic circuit 10 for controlling the ophthalmological device 1, specifically its laser source 11 and scanner system 13, for processing a curved treatment face C in eye tissue, and particularly for performing the feasibility check, prior to processing the curved treatment face C in the eye tissue.

In preparatory step S0, the electronic circuit 10 determines the scan capabilities of the scanner system 13. Depending on embodiment and/or configuration, the electronic circuit 10 determines the scan capabilities of the scanner system 13 by loading scanner characteristics data, e.g. as provided by the manufacturer of the scanner system 13 or as previously measured and recorded during a performance test, or by running an actual performance test to operate the scanner system 13 in a test mode (test routine) and measure and record the scan capabilities of the scanner system 13. The scanner characteristics data, loaded and/or measured, indicates the scan capabilities of the scanner system 13, particularly the performance characteristics of the plurality of scan axes of the scanner system 13.

In further preparatory step S1, the electronic circuit 10 determines the treatment to be performed by the ophthalmological device 1. Depending on embodiment and/or configuration, the electronic circuit 10 determines the treatment by receiving, from a separate computer or from a user via a user interface, a selection of a predefined treatment, or by receiving treatment definitions from the user via a computer aided design (CAD) software application.

In step S2, for the treatment defined in step S1, the electronic circuit 10 determines the treatment control data for controlling the scanner system 13 to process the curved treatment face C in the eye tissue. The electronic circuit 10 determines the treatment control data for the selected treatment and/or treatment definitions received in step S1. The person skilled in the art will understand that steps S1 and S2 can be executed by the electronic circuit 10 as a combined step S12, whereby the electronic circuit 10 receives selections and definitions of a treatment and generates the treatment control data for the received selections and definitions of the treatment.

In optional step S3, the electronic circuit 10 determines the actual alignment (in situ) of the patient interface 18 with respect to the eye 2. The actual alignment is determined in situ when the patient interface 18 is attached to the eye 2 and the focussing optical module 12 is thereby fixed on the eye 1. More specifically, the electronic circuit 10 determines the alignment of the central axis m of the patient interface 18 and the central axis q of the eye 2. In an embodiment, the electronic circuit 10 uses positional reference data from the measurement system 19 to determine the alignment.

In case there is a tilting angle φ in the alignment of the patient interface 18 and the eye 2, i.e. a tilting angle φ between the central axis m of the patient interface 18 and the central axis q of the eye 2, the electronic circuit 10 continues processing in optional step S4; otherwise, if the patient interface 18 and the eye 2 are aligned, processing continues in step S5.

In optional step S4, in case there is a tilting angle φ, the curved treatment face C to be processed in the eye tissue is to be tilted accordingly, with the same tilting angle φ between the central axis m of the patient interface 18 and the central axis of the curved treatment face C (see FIG. 9). Thus, in optional step S4, the electronic circuit 10 adjusts the treatment control data for controlling the scanner system 13 to process the curved treatment face C in the eye tissue with a tilting angle (p with respect to the central axis m of the patient interface 18.

In step S5, the electronic circuit 10 performs a feasibility check. Thus, as indicated above, the electronic circuit 10 determines whether or not the scan requirements needed for processing the curved treatment face C, as defined by the treatment control data generated in step S2 and/or adjusted in steps S4 or S6, exceed the scan capabilities of the scanner system 13. In other words, the electronic circuit 10 checks whether the scan dynamics required for moving the focal spot S along the processing path t, defined by the treatment control data, exceed the scan capabilities of the scanner system 13, defined by the performance characteristics of the plurality of scan axes of the scanner system 13. Depending on the embodiment and/or selected configuration, performing the feasibility check includes the electronic circuit 10 computing and executing a simulation or a "dry run" of moving the focal spot S along the processing path t defined by the treatment control data.

In the case of the computer simulation of moving the focal spot S along the processing path t, the electronic circuit 1 simulates the movement of the focal spot S using the treatment control data to drive a computer model of the scanner system 13 and its scan axes, whereby the computer model uses the scan capabilities of the scanner system 13, particularly the performance characteristics of the plurality of scan axes of the scanner system 13.

In case of the "dry run" of moving the focal spot S along the processing path t, the electronic circuit 1 sets the laser source 11 to a deactivated state or a reduced energy level, without any (lasting) effect to the eye tissue, and then uses the treatment control data to control the scanner system 13 to move the focal spot S or the virtual or imaginary focal spot, respectively, along the processing path t, defined by the treatment control data, to perform a "dry run" of processing the curved treatment face C in the eye tissue.

In both cases, the electronic circuit 10 determines the scan requirements used for processing the curved treatment face C defined by the treatment control data, as indicated schematically by step S50 of FIG. 18. In other words, the electronic circuit 10 determines the scan dynamics required of each of the plurality of scan axes of the scanner system 13 for moving the focal spot S along the processing path t, defined by the treatment control data.

For determining whether the scan requirements exceed the scan capabilities of the scanner system 13, the electronic circuit 10 checks for each of the plurality of scan axes of the scanner system 13 whether the scan dynamics required from the particular scan axis for moving the focal spot S along the processing path t, defined by the treatment control data, exceed the performance characteristics of the particular scan axis.

For example, the electronic circuit 10 checks whether the scan requirements for processing the curved treatment face C exceed the frequency characteristics of the scan axes of the scanner system 13. More specifically, as illustrated in the example of FIG. 17, the electronic circuit 10 checks whether the scan requirements determined by the required amplitudes Δz of movement of the actuated optics of an electromechanical zoom system or a z-modulator 133 for given spiral frequencies f of the processing path t, as depicted by curve taz, exceed the scan capabilities determined by the frequency characteristics of the electromechanical zoom system or z-modulator 133, which indicate the actuatable distances Δz for the given spiral frequencies f, as depicted by curve az. As indicated by circle Xa in the example of FIG. 17, for frequencies f above fx, approximately above fx=200 Hz, the scan requirements taz of the required actuated amplitude Δz exceed the scan capabilities az of actuatable distance Δz, resulting a negative (failed) feasibility check. Likewise, in the example of FIG. 17, the electronic circuit 10 checks whether the scan requirements determined by the required amplitudes Δz of the focal shift (of the focal spot S) generated by the actuated optics for given spiral frequencies f of the processing path t, as depicted by curve tfz, exceed the scan capabilities determined by the frequency characteristics with the actuatable distances Δz of the movement of focus for the given spiral frequencies f, as depicted by curve fz. As indicated by circle Xf in FIG. 17, for frequencies f above fx, approximately above fx=200 Hz, the scan requirements tfz of the required focus shift exceed the scan capabilities fz of actuatable focus shift, resulting a negative (failed) feasibility check.

In case of a negative outcome of the feasibility check, which indicates that moving the focal spot S along the processing path t, defined by the treatment control data, exceeds the scan capabilities of the scanner system 13, the electronic circuit 10 continues processing in step S6.

In step S6, the electronic circuit 10 generates an alarm signal and/or adjusts the treatment control data. The alarm signal comprises an acoustic, an optical, and/or an electronic signal, the latter being usable for triggering and initiating emergency measures in an external system. The alarm signal may further comprise an error message for the operator, e.g. indicating the cause or reason for the failed plausibility check and/or indicating possible measures for improving plausibility. For example, the alarm signal may signal to the operator that restarting the procedure with a different position and/or alignment of the patient interface 18 is necessary to proceed. Adjusting the treatment control data comprises the electronic circuit 10 changing the treatment control data such that the scan requirements no longer exceed the scan capabilities of the scanner system 13. For example, the electronic circuit 10 reduces or varies the speed of moving the focal spot S along the processing path t, to avoid that moving the focal spot S along the processing path t, defined by the treatment control data, exceeds the scan capabilities of the scanner system 13. Alternatively, the treatment control data is adjusted by altering the processing path t, e.g. its shape, to reduce the scan requirements for a modified curved treatment face C. As illustrated in FIG. 18, subsequently to adjusting the treatment control data, the electronic circuit 10 continues processing in step S5, performing another feasibility check, verifying that the scan requirements needed for processing the curved treatment face C, as defined by the adjusted treatment control data, do not exceed the scan capabilities of the scanner system 13.

In case of a positive outcome of the feasibility check, which indicates that moving the focal spot S along the processing path t, defined by the treatment control data, does not exceed the scan capabilities of the scanner system 13, the electronic circuit 10 continues processing in step S7.

In step S7, the electronic circuit 10 uses the treatment control data or the adjusted treatment control data, respectively, for controlling the scanner system 13 to move the focal spot S along the processing path t defined by the treatment control data for processing the curved treatment face C in the eye tissue.

The invention claimed is:

1. An ophthalmological device for processing a curved treatment face in eye tissue, the ophthalmological device comprising:
  a laser source configured to generate a pulsed laser beam;
  a focussing optical module configured to make the pulsed laser beam converge onto a focal spot in or on the eye tissue;
  a scanner system with a at least two scan axes configured to move the focal spot to target locations in or on the eye tissue, the scanner system having scan capabilities defined by scan performance characteristics of each particular scan axis; and
  a circuit configured to:
    use treatment control data to control the scanner system to move the focal spot in or on the eye tissue to target locations along a processing path defined by the treatment control data to process the curved treatment face in the eye tissue,
    perform a feasibility check, using the treatment control data and the scan performance characteristics of the at least two scan axes, prior to processing the curved treatment face in eye tissue, and
  perform at least one of:
    generating an alarm signal or adjusting the treatment control data, in case of a negative outcome of the feasibility check, indicating that moving the focal spot along the processing path, defined by the treatment control data, exceeds the scan capabilities of the scanner system, or
    use the treatment control data to control the scanner system to process the curved treatment face in the eye tissue, in case of a positive outcome of the feasibility check, indicating that moving the focal spot along the processing path, defined by the treatment control data, does not exceed the scan capabilities of the scanner system.

2. The ophthalmological device of claim 1, wherein the circuit is configured to perform the feasibility check by determining scan requirements for processing the curved treatment face, the scan requirements indicating dynamics of moving the focal spot along the processing path, defined by the treatment control data, and comparing the scan requirements to the scan capabilities of the scanner system.

3. The ophthalmological device of claim 1, wherein the scan performance characteristics of at least one of the scan axes include a maximum speed or frequency of a scan movement about the particular scan axis; and the circuit is configured to perform the feasibility check by determining whether moving the focal spot along the processing path, defined by the treatment control data, exceeds the maximum speed or frequency of the at least some of the scan axes.

4. The ophthalmological device of claim 1, wherein the scan performance characteristics of at least one of the scan axes include a maximum amplitude of a scan movement at a particular speed or frequency of the scan movement; and the circuit is configured to perform the feasibility check by determining whether moving the focal spot along the processing path, defined by the treatment control data, exceeds the maximum amplitude of the at least one of the scan axes.

5. The ophthalmological device of claim 1, wherein the scan performance characteristics of at least one of the scan axes include at least one of: a maximum acceleration of a scan movement about the particular scan axis, or a maximum speed of the acceleration of the scan movement about the particular scan axis; and the circuit is configured to perform the feasibility check by determining whether moving the focal spot along the processing path, defined by the treatment control data, exceeds the maximum acceleration of at least one of the scan axes or the maximum speed of the acceleration of the at least some of the scan axes.

6. The ophthalmological device of claim 1, wherein the circuit is configured to perform the feasibility check by computing a simulation of moving the focal spot along the processing path, using the treatment control data.

7. The ophthalmological device of claim 1, wherein the circuit is configured to perform the feasibility check by controlling the scanner system, using the treatment control data, while setting the laser source to at least one of: a deactivated state or a reduced energy without any effect to the eye tissue.

8. The ophthalmological device of claim 1, wherein the circuit is configured to adjust the treatment control data by reducing or varying a speed of moving the focal spot along the processing path, to avoid that moving the focal spot along the processing path, defined by the treatment control data, exceeds the scan capabilities of the scanner system.

9. The ophthalmological device of claim 1, wherein the ophthalmological device further comprises a patient interface having a central axis and being configured to fix the focussing optical module on the eye; and the circuit is further configured, in case of a tilt of the eye with respect to the central axis of the patient interface, to adapt the treatment control data to tilt the curved treatment surface corresponding to the tilt of the eye, prior to performing the feasibility check, and use the adapted treatment control data to perform the feasibility check.

10. The ophthalmological device of claim 1, wherein the scanner system is configured to move the focal spot along a spiral-shaped processing path.

11. The ophthalmological device of claim 1, wherein the scanner system comprises a first scan device, configured to move the focal spot with a feed speed along a feed line of the processing path, and the scanner system comprises a second scan device, configured to move the focal spot with a scan speed, which is higher than the feed speed, along a scan line extending transversely with respect to the feed line of the processing path.

12. A computer program product comprising a non-transitory computer-readable medium having stored thereon computer program code for controlling a processor of an ophthalmological device which comprises a laser source configured to generate a pulsed laser beam, a focussing optical module configured to make the pulsed laser beam converge onto a focal spot in the eye tissue, and a scanner system with at least two scan axes configured to move the focal spot to target locations in the eye tissue, the scanner system having scan capabilities defined by scan performance characteristics of each particular scan axis, wherein the computer program code is configured to control the processor such that the processor:
uses treatment control data to control the scanner system to move the focal spot in the eye tissue to target locations along a processing path defined by the treatment control data to process a curved treatment face in the eye tissue;
performs a feasibility check, using the treatment control data and the scan performance characteristics of the at least two scan axes, prior to processing the curved treatment face in eye tissue; and
performs at least one of:
generating an alarm signal or adjusting the treatment control data, in case of a negative outcome of the feasibility check, indicating that moving the focal spot along the processing path, defined by the treatment control data, exceeds the scan capabilities of the scanner system, or
uses the treatment control data to control the scanner system to process the curved treatment face in the eye tissue, in case of a positive outcome of the feasibility check, indicating that moving the focal spot along the processing path, defined by the treatment control data, does not exceed the scan capabilities of the scanner system.

13. The computer program product of claim 12, having computer program code stored on the computer-readable medium and configured to control the processor to perform the feasibility check by determining scan requirements for processing the curved treatment face, the scan requirements indicating dynamics of moving the focal spot along the processing path, defined by the treatment control data, and comparing the scan requirements to the scan capabilities of the scanner system.

14. The computer program product of claim 12, having computer program code stored on the computer-readable medium and configured to control the processor to perform the feasibility check by determining whether moving the focal spot along the processing path, defined by the treatment control data, exceeds a maximum speed or frequency of the scan movement about at least one of the scan axes, the scan performance characteristics of the at least one of the scan axes including a maximum speed or frequency of a scan movement about the particular scan axis.

15. The computer program product of claim 12, having computer program code stored on the computer-readable medium and configured to control the processor to perform the feasibility check by determining whether moving the focal spot along the processing path, defined by the treatment control data, exceeds a maximum amplitude of the scan movement about at least one of the scan axes, the scan performance characteristics of the at least one of the scan axes including a maximum amplitude of a scan movement at a particular speed or frequency of the scan movement.

16. The computer program product of claim 12, having computer program code stored on the computer-readable medium and configured to control the processor to perform the feasibility check by determining whether moving the focal spot along the processing path, defined by the treatment control data, exceeds at least one of: a maximum acceleration of the scan movement about at least one of the scan axes, or a maximum speed of the acceleration of the scan movement about the at least some of the scan axes, the scan performance characteristics of the at least one of the scan axes including at least one of: a maximum acceleration of a scan movement about the particular scan axis, or a maximum speed of the acceleration of the scan movement about the particular scan axis.

17. The computer program product of claim 12, having computer program code stored on the computer-readable medium and configured to control the processor to perform the feasibility check by computing a simulation of moving the focal spot along the processing path, using the treatment control data.

18. A method comprising:
generating, by a laser source, a pulsed laser beam;
focussing the pulsed laser beam to converge onto a focal spot in or on eye tissue;
moving, by a scanner system with a plurality of scan axes, the focal spot to target locations in or on the eye tissue, the scanner system having scan capabilities defined by scan performance characteristics of each particular scan axis;
using treatment control data to control the scanner system to move the focal spot in or on the eye tissue to target locations along a processing path defined by the treatment control data to process a curved treatment face in the eye tissue;
performing a feasibility check, using the treatment control data and the scan performance characteristics of the plurality of scan axes, prior to processing the curved treatment face in eye tissue; and
performing at least one of:
generating an alarm signal or adjusting the treatment control data, in case of a negative outcome of the feasibility check, indicating that moving the focal spot along the processing path, defined by the treatment control data, exceeds the scan capabilities of the scanner system, or
using the treatment control data to control the scanner system to process the curved treatment face in the eye tissue, in case of a positive outcome of the feasibility check, indicating that moving the focal spot along the processing path, defined by the treatment control data, does not exceed the scan capabilities of the scanner system.

19. The method of claim 18, wherein the performing the feasibility check comprises determining scan requirements for processing the curved treatment face, the scan requirements indicating dynamics of moving the focal spot along the processing path, defined by the treatment control data, and comparing the scan requirements to the scan capabilities of the scanner system.

20. The method of claim 18, wherein the scan performance characteristics of at least some of the scan axes include a maximum speed or frequency of a scan movement about the particular scan axis, the performing the feasibility check comprising determining whether moving the focal spot along the processing path, defined by the treatment control data, exceeds the maximum speed or frequency of the scan axes.

* * * * *